Patented Dec. 20, 1949

2,491,509

UNITED STATES PATENT OFFICE 2,491,509

PREPARATION OF 2-MERCAPTOPYRIMIDINES

Roger A. Mathes and Floyd D. Stewart, Akron, Ohio, assignors to The B. F. Goodrich Company, New York, N. Y., a corporation of New York No Drawing. Application February 18, 1948, Serial No. 9,335

9 Claims. (Cl. 260—251)

This invention relates to an improved method of preparation of 2-mercaptopyrimidines and more specifically relates to the preparation of 2-mercapto-3-aryl pyrimidines.

A previously suggested method of preparing 2-mercapto-3-aryl pyrimidines involves the reaction of diacetone amine,

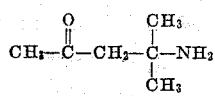

with phenyl isothiocyanate to produce N-2(2'-methyl pentanone-4) N'-phenyl thiourea and heating this substituted thiourea in the presence of a dehydrating catalyst such as hydrochloric acid to close the ring and form 2-mercapto-3-phenyl-4,6,6-trimethyl pyrimidine. This preparation employs reactants which are not readily available nor easily prepared.

We have discovered that 2-mercapto-3-aryl pyrimidines may be prepared in a simple single step process employing readily available reactants by simultaneously reacting a primary aryl amine, a salt of thiocyanic acid, and an alpha, beta-unsaturated ketone, i. e., a ketone having the general formula

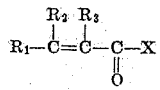

where $R_1$, $R_2$, and $R_3$ each may be a hydrogen atom or a hydrocarbon radical and where X is a hydrocarbon group. The reaction may be carried out in the presence of a strong non-oxidizing acid or the primary aryl amine may be replaced by a strong non-oxidizing acid salt of the aryl amine. Water is split out during the reaction, ring closure occurs, and the mercapto-pyrimidine is formed directly without the formation of intermediate products in excellent yields.

The reaction may be represented by the following generic equation where hydrochloric acid is employed:

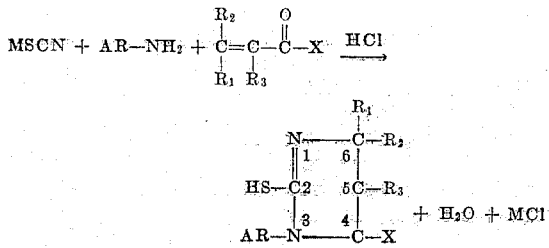

where AR is an aromatic hydrocarbon radical and where $R_1$, $R_2$, and $R_3$ each may be a hydrogen atom or a hydrocarbon radical, where X is a hydrocarbon radical and where M is the anion of the thiocyanic acid salt.

The precise proportions of the reactants employed are not critical although it is preferable to employ the reactants in substantially equimolecular proportions, i. e., one molecular equivalent of the primary amine and one molecular equivalent of thiocyanate for each molecular equivalent of the alpha, beta-unsaturated ketone. The concentration of the non-oxidizing acid employed is not critical and any desired quantity containing one molecular equivalent for each equivalent of amine may be employed. The temperature at which the reaction is carried out is not critical, but, in general, optimum yields are obtained when the reaction mixture is heated to a temperature where mild reflux takes place.

The alpha, beta-unsaturated ketones which may be employed as reactants according to this invention are any of the alpha, beta-unsaturated ketones having the general formula set forth above. Thus, any or all of $R_1$, $R_2$, and $R_3$ may be hydrogen or any hydrocarbon radical including alkyl, alkenyl, cycloalkyl, aryl, aralkyl and alkaryl radical as well as other radicals composed of carbon and hydrogen. Similarly, X may be any of the above-mentioned hydrocarbon radicals. For example, such alpha, beta-unsaturated ketones as mesityl oxide, phorone, butylidene acetone, heptylidene acetone, 5-methyl-4-heptene-one-3,5-ethyl-3-heptene-one-2,5-ethyl-3-nonene-one-2,3-methyl-4-ethyl-3-hexene-one-2, vinyl methyl ketone, vinyl ethyl ketone, acrylophenone, phenyl vinyl ketone, chalcone, acrylonaphthone, benzilidene acetone, 4-phenyl-3-butene-one-2, styryl n-hexyl ketone among others, may be employed as reactants in the preparation of 2-mercapto-3-aryl pyrimidines.

The primary aromatic amines which can be reacted with any of the above alpha, beta-unsaturated ketones and a thiocyanate salt according to this invention are for example aniline, toluidines (ortho, meta, and para), xylidines (2,3-, 2,4-, 2,5-, 2,6-, 3,4-, and 3,5-), xenylamine p-ethyl aniline, naphthylamines, p-phenylene diamine, 3-amino phenanthrene, amino fluorine, hydronaphthylamines, cumidines, aminocymenes, naphthylene diamines, and benzidines, among others. When an amine is employed as a reactant it is necessary to use a strong non-oxidizing acid such as hydrochloric or sulfuric acid, but the acid may be combined with the amine and the resulting acid salt of the amine can be employed as a reactant.

Any of the inorganic thiocyanate salts may be employed as reactants, but water-soluble thiocyanates such as the sodium, potassium and ammonium thiocyanate salts are preferred. Also, the by-products formed when these thiocyanates are employed are easily and conveniently removed from the desired 2-mercapto 3-aryl pyrimidine products.

In carrying out the reaction, the reactants are brought together in any desired manner, preferably by agitating the reactants in the presence of an inert solvent or diluent such as water, ether, benzene, hexene or other inert liquids. It is not necessary to employ a reaction diluent, for the desired reaction will take place when the reactants are merely combined and heated to reflux as herein described. In general, heating to the reflux temperature, no higher than 100° in most cases and usually in the range of 70° C. to 100° C. when the reaction is carried out at atmospheric pressure, is desirable. But the reaction will take place at room temperature or below. The pressure at which the reaction is carried out is not critical and may be varied as desired, but, in general, it will be found that the reaction is most conveniently carried out at atmospheric pressure for then only standard acid-resistant reaction equipment need be used.

The following specific examples are merely illustrative of our invention and are by no means a limitation thereto. In each of the examples the parts are by weight.

Example I

To a mixture comprising 49 parts of mesityl oxide, 38 parts of ammonium thiocyanate, 100 parts of water and 53.9 parts of o-toluidine in an acid resistant reaction vessel equipped with a reflux condenser and means for stirring, heating and cooling, there was added 55 parts of hydrochloric acid (37%) over a period of 10 minutes while agitating the mixture. During the addition of the acid the temperature of the mixture was 24° C. After all the acid had been added, the mixture was heated to 95° C. at which temperature the reaction mixture refluxed mildly. While the reaction mixture was refluxing, a buff-colored, crystalline product formed as a precipitate. The refluxing was carried out for about 45 minutes and then the resulting mixture was cooled to room temperature and filtered to recover the crystalline product. The recovered product, 2-mercapto-3-o-tolyl-4,6,6-trimethylpyrimidine, was washed with water and dried. A yield of 105 parts of the dried products was recovered.

Example II

To a mixture of 49 parts of mesityl oxide, 38 parts of ammonium thiocyanate and 150 parts of water in an acid resistant reaction vessel there was added 71.7 parts of o-toluidine hydrochloride dissolved in 300 parts of water while the mixture was stirred. The reaction mixture was heated and a precipitate began to form at 30° C. The heating was continued and maintained at 80° C. for 45 minutes. The resulting slurry was cooled to room temperature and the buff-colored product was recovered by filtration, washed with water and dried. A yield of 92 parts of 2-mercapto-3-o-tolyl-4,6,6-trimethylpyrimidine was recovered.

Example III

To a mixture comprising 49 parts of mesityl oxide, 38 parts of ammonium thiocyanate, 100 parts of water, and 46.5 parts of aniline at 10° C. there was added 49.2 parts of hydrochloric acid (37%) while the mixture was stirred and the temperature was maintained at 10-15° C. The resulting mixture was stirred for 20 hours without supplying heating or cooling. During this period of reaction the temperature of the mixture rose to a maximum of 29° C. by the heat of reaction and 68 parts of a light colored, crystalline product were precipitated and recovered. The product was found to be 2-mercapto-3-phenyl-4,6,6-trimethylpyrimidine.

Example IV

The same reactants in the same proportions as in Example III were employed but the reactants were combined at 20-25° C. and then heated to 75° C. for one hour while the mixture refluxed mildly. The light colored precipitate that formed during the refluxing was recovered by filtration, washed with water, and dried. A yield of 66 parts of the same product as Example III was recovered in this manner.

Example V

Paraphenylene - bis - 3,3'-(2-mercapto-4,6,6-trimethylpyrimidine) was prepared by combining 49 parts of mesityl oxide, 38 parts of ammonium thiocyanate, 100 parts of water, 27 parts of p-phenylene diamine and 50 parts of hydrochloric acid (37%) at 20-23° C. and then heating to mild reflux, 85° C., for about one hour. The product which also formed as a crystalline precipitate during reflux was recovered by filtration, washed with water and dried. 59 parts of this bis-pyrimidine were recovered.

Example VI 124 parts of 2-mercapto-3-alpha naphthyl-4,6,6-trimethyl a green crystalline material was prepared by the reaction of 49 parts of mesityl oxide, 38 parts of ammonium thiocyanate, 71.5 parts of alpha naphthylamine in the presence of 100 parts of water and 50 parts of hydrochloric acid (37%). A putty-like slurry formed at room temperature was stirred and heated to 70° C. for about 20 minutes after which the slurry was cooled and filtered. The product was washed with water and dried.

Example VII 2-mercapto - 3 - o-tolyl-4-methylpyrimidine was prepared by adding 50 parts of hydrochloric acid (37%) to a mixture comprising 35 parts of methyl vinyl ketone, 38 grams of ammonium thiocyanate, 71.7 parts of ortho toluidine and 100 parts of water. The mixture was stirred and heated to 90° C., maintained at that temperature for one hour, and stirred without heating for six more hours. A putty-like precipitate then formed which was recovered from the reaction mixture by filtration. The recovered product was taken up in acetone and after evaporating part of the acetone 35.5 parts of yellowish-white crystals were filtered off and identified as substantially pure 2-mercapto-3-o-tolyl-4-methylpyrimidine.

Example VIII 2-mercapto-3-o-tolyl-4,6,6-trimethylpyrimidine was also prepared by adding to a mixture containing 49 parts of mesityl oxide, 38 parts of ammonium thiocyanate, 53.9 parts of o-toluidine, a mixture of 53 parts of sulfuric acid (95.5%) diluted with 106 parts of crushed ice at 30 to 40° C. The resulting reaction mixture was heated to 95° C. and refluxed for one hour. The 2-mercapto pyrimidine which precipitated during the reflux period was recovered by filtration and was washed and dried. By this manner of preparation 108 parts of 2-mercapto-3-o-tolyl-4,6,6-trimethylpyrimidine was recovered.

In a like manner other 2-mercapto-3-arylpyrimidines may be prepared. For example, 2-mercapto-3-phenyl-4-methyl-6-ethylpyrimidine can be prepared by reacting butilidene acetone, aniline and ammonium thiocyanate in the presence of hydrochloric or sulfuric acid; 2-mercapto-3-o-tolyl-4-methyl-6-phenylpyrimidine can be prepared by reacting benzilidene acetone, o-toluidine and ammonium thiocyanate in the presence of hydrochloric or sulfuric acid; 2-mercapto-3-phenyl-4-methyl-6-n-propylpyrimidine can be prepared by reacting 5-ethyl-3-heptene-one-2, aniline and ammonium thiocyanate in the presence of a strong non-oxidizing acid; 2-mercapto-3,4,6-triphenylpyrimidine can be prepared by reacting chalcone, aniline and ammonium in the presence of a strong non-oxidizing acid; and 2-mercapto-3-alpha-naphthyl-4-phenylpyrimidine can be prepared by reacting acrylophenone (vinyl phenyl ketone), alpha-naphthylamine and ammonium thiocyanate in the presence of a strong non-oxidizing acid.

Also, any one of the above enumerated alpha, beta-unsaturated ketones may be reacted with any of the primary aromatic amines and a thiocyanate in the presence of a strong non-oxidizing acid to produce a 2-mercapto-3-arylpyrimidine as described above.

Although ammonium thiocyanate was exclusively employed throughout all of the above examples, it will be understood that such thiocyanate as potassium or sodium thiocyanate among others can be employed with equal success. But, in general, it will be preferred to use ammonium, potassium or sodium thiocyanate because of their availability.

Having disclosed specific examples of our invention which are merely intended to be illustrative of our process and are not to be construed as limiting thereon, we do not desire nor intend to limit ourselves solely thereto, for it will be apparent to those skilled in the art that the precise proportions of the materials utilized and the time and temperature of the reaction may be varied and that other materials have equivalent chemical and physical properties may be employed, if desired, without departing from the spirit and scope of our invention as defined in the appended claims.

We claim:

1. A process for the preparation of 2-mercapto-3-arylpyrimidines which comprises simultaneously reacting an alpha, beta-unsaturated ketone, a salt of thiocyanic acid and a primary aromatic amine in the presence of a strong non-oxidizing acid and recovering the 2-mercapto-3-arylpyrimidine thus formed.

2. A process for the preparation of 2-mercapto-3-arylpyrimidines which comprises simultaneously reacting an alpha, beta-unsaturated ketone, a salt of thiocyanic acid and a primary aromatic amine in the presence of hydrochloric acid and recovering the 2-mercapto-3-arylpyrimidine thus formed.

3. A process for the preparation of 2-mercapto-3-arylpyrimidines which comprises simultaneously reacting an alpha, beta-unsaturated ketone, a salt of thiocyanic acid and a primary aromatic amine hydrochloride and recovering the 2-mercapto-3-arylpyrimidine thus formed.

4. A process for the preparation of 2-mercapto-3-arylpyrimidines which comprises simultaneously reacting an alpha, beta-unsaturated ketone, ammonium thiocyanate and a primary aromatic amine in the presence of hydrochloric acid and recovering the 2-mercapto-3-arylpyrimidine thus formed.

5. A process for the preparation of 2-mercapto-3-arylpyrimidines which comprises simultaneously reacting an alpha, beta-unsaturated ketone, ammonium thiocyanate and a primary aromatic amine hydrochloride and recovering the 2-mercapto-3-arylpyrimidine thus formed.

6. A process for the preparation of 2-mercapto-3-aryl-4,6,6-trimethylpyrimidines which comprises simultaneously reacting mesityl oxide, ammonium thiocyanate and a primary aromatic amine in the presence of hydrochloric acid and recovering the 2-mercapto-3-aryl-4,6,6-trimethylpyrimidine thus formed.

7. A process for the preparation of 2-mercapto-3-phenyl-4,6,6-trimethylpyrimidine which comprises simultaneously reacting mesityl oxide, ammonium thiocyanate and aniline in the presence of hydrochloric acid and recovering the 2-mercapto-3-phenyl-4,6,6-trimethylpyrimidine thus formed.

8. A process for the preparation of 2-mercapto-3-alpha-naphthyl-4,6,6-trimethylpyrimidine which comprises simultaneously reacting mesityl oxide, ammonium thiocyanate and alpha-naphthylamine in the presence of hydrochloric acid and recovering the 2-mercapto-3-alpha-naphthyl-4,6,6-trimethylpyrimidine thus formed.

9. A process for the preparation of 2-mercapto-3-o-tolyl-4,6,6-trimethylpyrimidine which comprises simultaneously reacting mesityl oxide, ammonium thiocyanate and o-toluidine in the presence of hydrochloric acid and recovering the 2-mercapto-3-o-tolyl-4,6,6-trimethylpyrimidine thus formed.

ROGER A. MATHES.
FLOYD D. STEWART.

REFERENCES CITED

The following references are of record in the file of this patent:

UNITED STATES PATENTS

| Number | Name | Date |
|---|---|---|
| 2,234,848 | Ter Horst | Mar. 11, 1941 |